(12) United States Patent
Griffin et al.

(10) Patent No.: US 8,117,825 B2
(45) Date of Patent: Feb. 21, 2012

(54) GAS TURBINE INSTALLATION

(75) Inventors: Timothy Griffin, Ennetbaden (CH); Gianfranco Guidati, Zürich (CH); Hans Wettstein, Fislisbach (CH); Majed Toqan, Abu Dhabi (AE)

(73) Assignee: ALSTOM Technology Ltd., Baden (CH)

( * ) Notice: Subject to any disclaimer, the term of this patent is extended or adjusted under 35 U.S.C. 154(b) by 1560 days.

(21) Appl. No.: 11/277,779

(22) Filed: Mar. 29, 2006

(65) Prior Publication Data
US 2007/0034171 A1 Feb. 15, 2007

(30) Foreign Application Priority Data
Mar. 31, 2005 (DE) .......................... 10 2005 015 151

(51) Int. Cl.
*F23C 9/08* (2006.01)
(52) U.S. Cl. ....................... 60/39.52; 60/39.59
(58) Field of Classification Search .............. 60/39.182, 60/39.52, 39.53, 39.58, 39.59
See application file for complete search history.

(56) References Cited

U.S. PATENT DOCUMENTS

| | | | |
|---|---|---|---|
| 3,177,633 A * | 4/1965 | McDonald, Jr. .................... 96/1 |
| 3,785,145 A | 1/1974 | Amann | |
| 3,965,675 A * | 6/1976 | Martz et al. ................. 60/39.182 |
| 4,133,171 A | 1/1979 | Earnest et al. | |
| 4,267,692 A | 5/1981 | Earnest | |
| 4,271,664 A * | 6/1981 | Earnest ....................... 60/39.181 |
| 5,622,044 A * | 4/1997 | Bronicki et al. ............. 60/39.182 |
| 5,794,431 A * | 8/1998 | Utamura et al. ................ 60/783 |
| 6,202,400 B1 * | 3/2001 | Utamura et al. ................ 60/773 |
| 6,513,318 B1 | 2/2003 | Wright | |
| 6,957,539 B2 * | 10/2005 | Lebas et al. ..................... 60/772 |
| 2002/0043063 A1 * | 4/2002 | Kataoka et al. ............ 60/39.182 |
| 2005/0150231 A1 * | 7/2005 | Laster et al. ..................... 60/777 |
| 2006/0225430 A1 * | 10/2006 | Paprotna et al. ................ 60/782 |

FOREIGN PATENT DOCUMENTS
DE   10297365   2/2005
WO   W003029618   4/2003

OTHER PUBLICATIONS

Search Report for German Patent App. No. 10 2005 015 151.5 (Apr. 9, 2010).

* cited by examiner

*Primary Examiner* — Ehud Gartenberg
*Assistant Examiner* — Vikansha Dwivedi
(74) *Attorney, Agent, or Firm* — Cermak Nakajima LLP; Adam J. Cermak

(57) ABSTRACT

A gas turbine installation (1), in particular in a power plant for generating electricity, includes a turboset (2) having a turbine (4), a compressor (5) and a combustion chamber (6) arranged in a gas path (9) connecting the compressor (5) to the turbine (4), and a flue gas recirculation device (3), which passes combustion flue gas from the turbine (4) from a flue gas path (14) connected to the turbine (4) via a recirculation path (16) to a fresh gas path (13) connected to the compressor (5). To improve the efficiency of the gas turbine installation (1), a control device (17) controls a volumetric flow and/or a temperature of the recirculated combustion flue gases in such a way that a fresh gas/flue gas mixture which enters the compressor (5) is at a predetermined desired temperature.

15 Claims, 2 Drawing Sheets

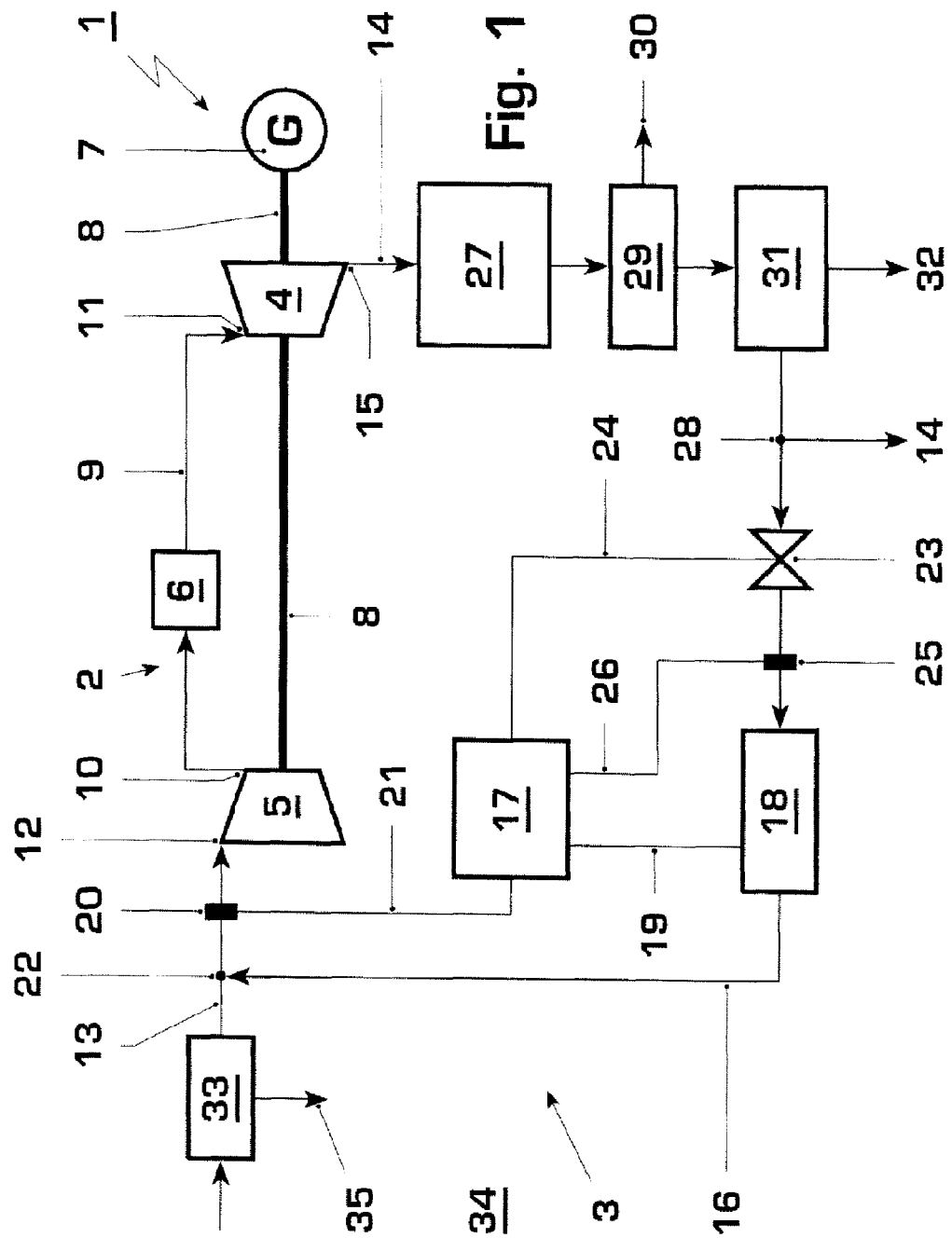

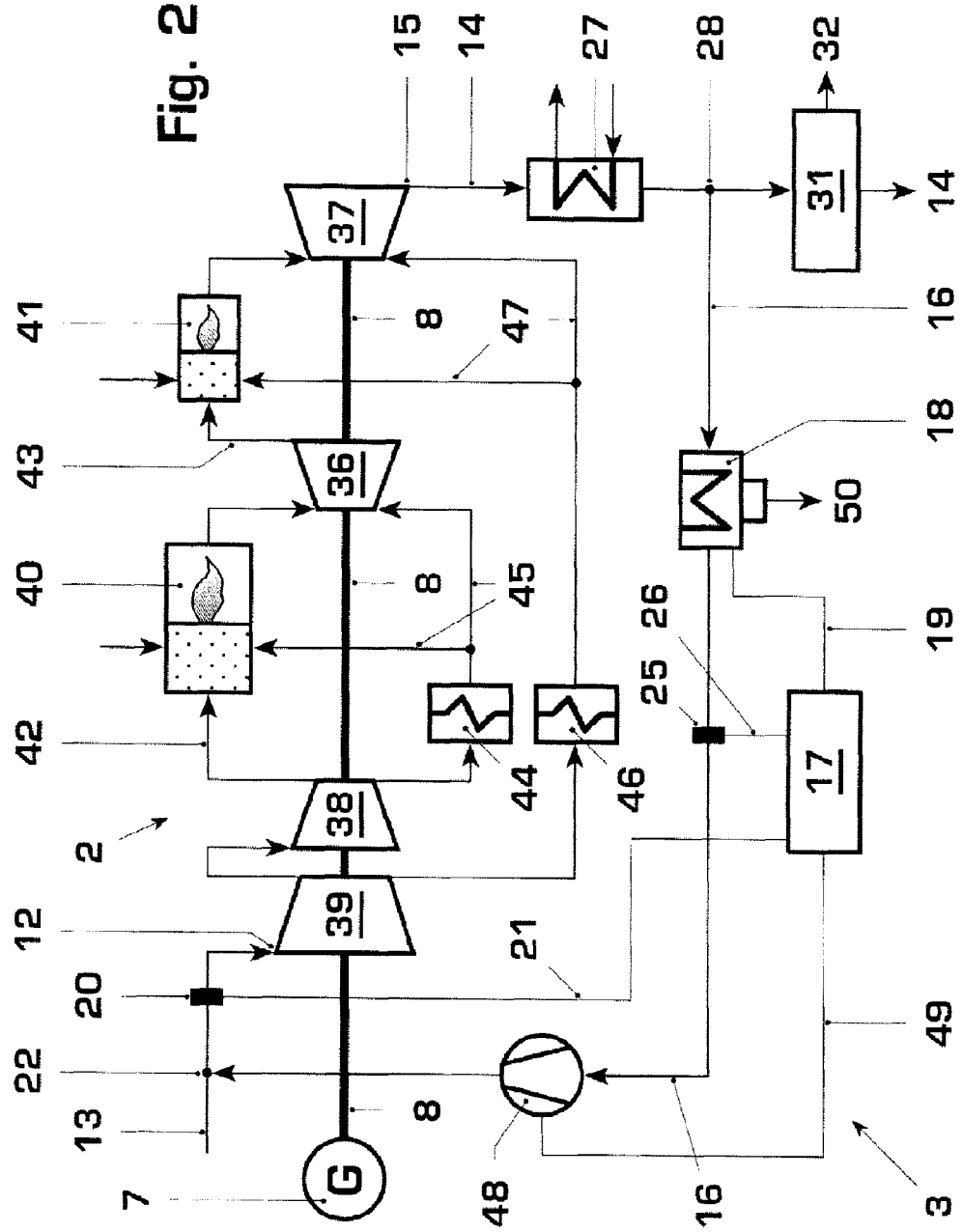

GAS TURBINE INSTALLATION

This application claims priority under 35 U.S.C. §119 to German application number 10 2005 015 151.5, filed 31 Mar. 2005, the entirety of which is incorporated by reference herein.

BACKGROUND OF THE INVENTION

1. Field of the Invention

The present invention relates to a gas turbine installation, in particular in a power plant for generating electricity.

2. Brief Description of the Related Art

DE 102 97 365 has disclosed a gas turbine installation of this type which is equipped with a turboset and with a flue gas recirculation device. The turboset comprises a turbine, a compressor which is drive-coupled thereto and a combustion chamber arranged in a gas path connecting the compressor to the turbine. When the gas turbine installation is operating, the flue gas recirculation device passes combustion flue gas from the turbine from a flue gas path connected to the turbine via a recirculation path to a fresh gas path connected to the compressor. The recirculation of combustion flue gases reduces the oxygen content in the combustion zone and therefore reduces the NOx formation at a given flame temperature.

WO 03/029618 has disclosed another gas turbine installation which normally operates with a closed working gas circuit. This means that the combustion flue gases from the turbine are fed back to the compressor without new fresh gas having to be added to this working gas circuit or combustion flue gas being discharged to the outside. In this way, this gas turbine installation normally operates virtually without any emissions. To start up this gas turbine installation, it is additionally equipped with a fresh gas path, via which fresh gas can be fed to the compressor. There is also a flue gas path, via which the combustion flue gases can be discharged during starting operation.

SUMMARY OF THE INVENTION

This forms the starting point of the present invention. The invention deals with the problem of specifying an improved embodiment of a gas turbine installation of the type described in the introduction, which is distinguished in particular by increased gas turbine installation efficiency.

One aspect of the present invention includes setting the temperature of a fresh gas/flue gas mixture fed to the compressor to a predetermined desired temperature with the aid of the recirculated combustion flue gas. With a view to generating electricity, the rotating components of a gas turbine installation, i.e., in particular the rotors of the turbine, the compressor and a generator, have to rotate at a rotational speed which is, as far as possible, constant in order to be able to satisfy the demands of a stable electricity grid with a constant alternating current frequency. Conventional compressors of a conventional gas turbine installation are designed to be able to operate properly in a relatively wide range of ambient temperatures. A range of ambient temperatures from −20° C. to +50° C. is usually taken into account in this context. Accordingly, a conventional compressor is designed in such a way that it has a correspondingly high pumping limit margin. The setting of the mixture temperature at the entry of the compressor to a predefined temperature value, as proposed in accordance with the invention, makes it possible to considerably reduce the range of temperature fluctuations which occur, for example from 70 K to 10 K. Accordingly, the compressor can be designed in such a way that it has a considerably lower pumping limit margin. By way of example, the pumping limit margin can be reduced by 5%. This leads to an increase in the efficiency of the compressor, for example by 1.5%, which means that more power is available for driving the generator and/or the fuel consumption of the gas turbine installation can be reduced accordingly. Furthermore, the compressor may possibly even be able to make do with a reduced number of compressor stages, with the result that the production costs of the compressor can be reduced accordingly. Therefore, the invention makes it possible to increase the efficiency of the gas turbine installation using a flue gas recirculation device which is in any case already present, in order to deliberately set the inlet temperature of the compressor with the aid of the flue gas recirculation.

According to an advantageous refinement, a recirculation cooler for cooling the recirculated combustion flue gases may be arranged in a recirculation path which carries the recirculated flue gases from a flue gas path to a fresh air path. This recirculation cooler has a controllable cooling capacity, and for this purpose is coupled to a control device of the gas turbine installation. The temperature of the recirculated flue gases can be predetermined by virtue of these gases being cooled. The temperature of the fresh gas/flue gas mixture can then be set using the temperature of the recirculated flue gases.

In addition or as an alternative, a recirculation valve, with the aid of which the volumetric flow of the recirculated combustion flue gases can be controlled, may be arranged in the recirculation path, this recirculation valve accordingly being coupled to the control device. If the recirculated combustion flue gases are at a different temperature from the fresh gas, the temperature of the fresh gas/flue gas mixture can also be set in a controlled way by means of the volumetric flow, i.e., by means of the recirculation rate of the recirculated flue gases.

It is preferable for the control device, when setting the temperature of the fresh gas/flue gas mixture, to take into account both the volumetric flow and the temperature of the recirculated flue gases. In this way, on the one hand changes to the recirculation rate as a function of the respective operating state of the gas turbine installation can be carried out, while at the same time the temperature at the entry to the compressor can be kept substantially constant by the cooling capacity of the recirculation cooler being correspondingly adapted.

Further important features and advantages of the gas turbine installation according to the invention will emerge from the drawings and the associated description of figures with reference to the drawings.

BRIEF DESCRIPTION OF THE DRAWINGS

Preferred exemplary embodiments of the invention are illustrated in the drawings and explained in more detail in the description which follows, in which identical reference designations relate to identical or similar or functionally equivalent components. In the drawings:

FIG. 1 diagrammatically depicts a highly simplified outline illustration, in circuit diagram form, of a gas turbine installation according to the invention.

FIG. 2 shows a diagrammatic illustration similar to that shown in FIG. 1, but for a different embodiment.

DETAILED DESCRIPTION OF EXEMPLARY EMBODIMENTS

In accordance with FIG. 1, a gas turbine installation 1 according to the invention includes at least one turboset 2 and at least one flue gas recirculation device 3. The turboset 2 includes at least one turbine 4, at least one compressor 5 and at least one combustion chamber 6. Furthermore, there is usually at least one generator 7. Turbine 4, compressor 5 and generator 7 are drive-coupled, which is indicated here by a common shaft 8. The combustion chamber 6 is arranged in a gas path 9 connecting an outlet 10 of the compressor 5 to an inlet 11 of the turbine 4. An inlet 12 of the compressor 5 is supplied with fresh gas via a fresh gas path 13. There is also a flue gas path 14, which is connected to an outlet 15 of the turbine 4 and discharges combustion flue gases from the turbine 4.

The gas turbine installation 1 is expediently part of a power plant which is not shown in more detail and is used to generate electricity.

The flue gas recirculation device 3 has a recirculation path 16, which on the entry side is connected to the flue gas path 14 and on the exit side is connected to the fresh gas path 13. Accordingly, with the aid of the flue gas recirculation device 3 combustion flue gases can be recirculated from the flue gas path 14 to the fresh gas path 13. The advantages of intensive flue gas recirculation while the gas turbine installation 1 is operating are explained in more detail in DE 102 97 365, which has already been mentioned above and the content of which is hereby incorporated by express reference in the content of disclosure of the present invention.

Furthermore, the gas turbine installation 1 is equipped with a control device 17, which is designed in such a way that it can regulate a volumetric flow and/or a temperature of the recirculated combustion flue gases, specifically in such a way that a predetermined desired temperature is set for a fresh gas/flue gas mixture which enters the compressor 5. By way of example, the desired temperature can be set to an accuracy of within +/−5 K with the aid of the control device 17. Accordingly, the mixture temperature at the inlet 12 of the compressor 5 can only fluctuate in a range of approximately 10 K, with the result that it is fundamentally possible for the compressor 5 to be operated closer to its pumping limit, which increases the efficiency of the gas turbine installation 1. Furthermore, to realize a new gas turbine installation 1, it is possible for the compressor 5 to be designed accordingly, so that at the rated operating point it has a reduced pumping limit margin, which additionally increases the efficiency of the compressor 5 and therefore the efficiency of the gas turbine installation 1.

To enable the mixture temperature to be set in the desired way with the aid of the recirculated flue gases, the flue gas recirculation device 3 may be equipped with a recirculation cooler 18 which is arranged in the recirculation path 16. The recirculation cooler 18 is used to cool the recirculated combustion flue gases, and its cooling capacity is controllable. For this purpose, the recirculation cooler 18 is suitably coupled to the control device 17, for example via a control line 19. Furthermore, it is possible to provide a temperature sensor 20 which is coupled to the control device 17 via a corresponding signal line 21. In the embodiment shown here, this temperature sensor 20 is arranged in such a way that it can be used to determine the temperature of the mixture. In the present case, therefore, this temperature sensor 20 is arranged in the fresh gas path 13 downstream of an introduction point 22. The recirculation path 16 opens out into the fresh gas path 13 at this introduction point 22. To improve the control process, it would also be possible for a further temperature sensor to be arranged in the recirculation path 16 downstream of the recirculation cooler 18.

In addition or as an alternative, the flue gas recirculation device 3 may also be equipped with a recirculation valve 23, which is configured in such a way that it can be used to set a volumetric flow of the recirculated combustion flue gases, i.e., a recirculation rate. For this purpose, the recirculation valve 23 is arranged in the recirculation path 16 and is correspondingly coupled to the control device 17, for example via a control line 24. A flow sensor 25, which is suitably coupled to the control device 17, for example via a signal line 26, may additionally be provided. The flow sensor 25 is configured in such a way that it can determine the volumetric flow of the combustion flue gases flowing within the recirculation line 16. For this purpose, the flow sensor 25 is arranged in the recirculation path 16, for example downstream of the recirculation valve 23. In the exemplary embodiment shown, the recirculation valve 23 is arranged upstream of the recirculation cooler 18. It is equally possible for the recirculation valve 23 to be arranged downstream of the recirculation cooler 18. The flow sensor 25 is in this case arranged upstream of the recirculation cooler 18, but it could equally be arranged downstream of the recirculation cooler 18.

In the embodiment shown here, the gas turbine installation 1 is additionally equipped with a heat recovery steam generator 27, which is arranged in the flue gas path 14. A branching point 28, at which the recirculation path 16 branches off from the flue gas path 14, is in this case arranged downstream of this steam generator 27. Furthermore, a flue gas cooler 29 may optionally be arranged in the flue gas path 14 downstream of the steam generator 27. This flue gas cooler 29 can be used, for example, to dehumidify the flue gases by cooling the combustion flue gases to below the dew point of water, with the result that the water condenses out and can be discharged as indicated by an arrow 30. It is expedient for the flue gas path 14 to optionally include a carbon dioxide separation device 31 which makes it possible to remove carbon dioxide from the combustion flue gas. The $CO_2$ which has been removed from the flue gas can be discharged as indicated by an arrow 32. In the embodiment shown in FIG. 1, the branching point 28 is arranged downstream of the $CO_2$ separation device 31. The $CO_2$ separation device 31 is in this case arranged downstream of the steam generator 27 and downstream of the optional flue gas cooler 29.

The embodiment shown in FIG. 1 includes a device 33 for increasing the oxygen content in the fresh gas in the fresh gas path 13. The fresh gas is usually air which is sucked in from the environment 34 surrounding the gas turbine installation 1. The oxygen content in air can be increased, for example, by removing nitrogen from the air and discharging it as indicated by an arrow 35. This can be done, for example, with the aid of a membrane which is permeable to oxygen and impermeable to nitrogen; other methods for increasing the oxygen content in the fresh gas are also conceivable. The higher the oxygen content in the fresh gas, the more flue gases can be recirculated, i.e., the higher the recirculation rate which can be set.

To enable the desired temperature in the fresh gas/flue gas mixture to be set at the inlet 12 of the compressor 5, the control device 17 compares the actual temperature in the mixture with the desired temperature. Depending on this desired/actual comparison, the control device 17 can actuate the recirculation cooler 18 to increase or reduce the cooling capacity. In addition or as an alternative, the control device 17 can actuate the recirculation valve 23 to increase or reduce the recirculation rate. In this context, it is quite possible that in certain operating states of the gas turbine installation 1 a specific recirculation rate will need to be set, which can be realized, for example, using the flow sensor 25. The temperature control in the mixture then takes place predominantly by controlling the capacity of the recirculation cooler 18.

The recirculation cooler 18 can in principle be configured in such a way that it can be used to cool the recirculated combustion flue gas to such an extent that its temperature is below the ambient temperature in the vicinity of the gas turbine installation 1. In this way, for example, it is possible to assist with dehumidification of the recirculated flue gases. Furthermore, it is in principle possible for a corresponding dehumidification device (not shown here) to be integrated in the recirculation path 16 downstream of the recirculation cooler 18.

Furthermore, it is in principle possible for the recirculation cooler 18 to be configured as a water spray cooler. With a recirculation cooler 18 of this type, the recirculated combustion flue gas is cooled by water being sprayed into the combustion flue gas. In addition to the cooling effect, this simultaneously increases the mass in the combustion flue gas, which increases the mass flow to the compressor 5 and therefore the power of the turboset 2. In addition or as an alternative, the compressor 5 may be equipped with an atomization device (not shown here), which makes it possible to inject water droplets into the fresh gas/flue gas mixture. This addition of water to the mixture likewise serves to increase the mass in the working gas and to increase the power of the turboset 2.

The flue gas recirculation device 3 is expediently designed in such a way that when the gas turbine installation 1 is operating, it is impossible for any (significant) rise in pressure to form in the flue gas path 14 downstream of the steam generator 27. This can be achieved, for example, by a pressure lower than ambient pressure being set in the region of the introduction point 22.

Removal of $CO_2$ from the flue gases of the gas turbine installation 1 is of considerable importance in view of the associated greenhouse effect. A method of removing $CO_2$ from the flue gas from a gas turbine can be found in EP 1 484 102, the content of which is hereby incorporated by express reference in the content of disclosure of the present invention. The flue gas recirculation increases the $CO_2$ concentration in the combustion zone and leads to an increased $CO_2$ concentration in the flue gas. This is advantageous since the $CO_2$ separation device 31 can operate more effectively with a higher $CO_2$ concentration. A further improvement to the efficiency of the $CO_2$ separation device 31 results if the branching point 28 is arranged upstream of the $CO_2$ separation device 31, which is realized for example with the embodiment shown in FIG. 2.

FIG. 2 shows an embodiment of the gas turbine installation 1 according to the invention which operates with sequential combustion. For this purpose, the turboset 2 includes a high-pressure turbine 36, a low-pressure turbine 37, a high-pressure compressor 38, a low-pressure compressor 39, a high-pressure combustion chamber 40 and a low-pressure combustion chamber 41. A gas turbine installation 1 with sequential combustion is fundamentally known from DE 103 60 951, the content of which is hereby incorporated by express reference in the content of disclosure of the present invention.

The fresh gas path 13 is connected to the inlet 12 of the low-pressure compressor 39. The exit side of this low-pressure compressor 39 is connected to the entry side of the high-pressure compressor 38, the exit side of which is connected, via a first gas path 42, in which the high-pressure combustion chamber 40 is arranged, to the entry side of the high-pressure turbine 36.

The exit side of the high-pressure turbine 36 is connected, via a second gas path 43, in which the low-pressure combustion chamber 41 is arranged, to an entry side of the low-pressure turbine 37. The flue gas path 14 is connected to the outlet 15 of the low-pressure turbine 37. Compressed gas can be removed from the high-pressure compressor 38 on the exit side and fed to a first cooler 44, allowing high-pressure cooling gas to be obtained, which can be used in a first cooling gas path 45 to cool the high-pressure combustion chamber 40 and the high-pressure turbine 36. In a corresponding way, compressed gas can be removed on the pressure side of the low-pressure compressor 39 and is cooled in a second cooler 46. It is in this way possible to obtain low-pressure cooling gas, which can be fed via a second cooling gas path 47 to the low-pressure turbine 37 and the low-pressure combustion chamber 41.

In the embodiment shown in FIG. 2, the temperature control of the fresh gas/flue gas mixture functions in fundamentally the same way as in the embodiment shown in FIG. 1. However, the variant shown here differs from that of FIG. 1 by virtue of the fact that a blower 48 is arranged in the recirculation path 16 instead of a recirculation valve 23. The blower 48 is configured in such a way that it can be used to drive the recirculated combustion flue gases in the direction of fresh gas path 13. The blower 48 is in this case arranged downstream of the recirculation cooler 18 and is coupled to the control device 17 via a corresponding control line 49. The volumetric flow of the recirculated combustion flue gases can be controlled with the aid of the blower 48 by means of suitable actuation. In the embodiment shown here, therefore, the blower 48 performs the function of the recirculation valve 23. It is in principle also conceivable to use an embodiment which has both a blower 48 and a recirculation valve 23.

In the embodiment shown in FIG. 2, the recirculation cooler 18 is simultaneously configured in such a way that it can be used to dry the recirculated combustion flue gas. The water which is thereby formed can be discharged as indicated by an arrow 50.

List of Designations
1 Gas turbine installation
2 Turboset
3 Flue gas recirculation device
4 Turbine
5 Compressor
6 Combustion chamber
7 Generator
8 Drive shaft
9 Gas path
10 Outlet of 5
11 Inlet of 4
12 Inlet of 5
13 Fresh gas path
14 Flue gas path
15 Outlet of 5
16 Recirculation path
17 Control device
18 Recirculation cooler
19 Control line
20 Temperature sensor
21 Signal line
22 Introduction point
23 Recirculation valve
24 Control line
25 Flow sensor
26 Signal line
27 Steam generator
28 Branching point
29 Flue gas cooler
30 Water which has been separated off
31 $CO_2$ separation device
32 $CO_2$ which has been separated off
33 Device 34 Environment
35 N₂ which has been separated off
36 High-pressure turbine
37 Low-pressure turbine
38 High-pressure compressor
39 Low-pressure compressor
40 High-pressure combustion chamber
41 Low-pressure combustion chamber
42 First gas path
43 Second gas path
44 First cooler
45 First cooling gas path
46 Second cooler
47 Second cooling gas path
48 Blower
49 Control line
50 Water which has been separated off While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A gas turbine installation comprising:
at least one turboset including at least one turbine, at least one compressor coupled to the turbine, a gas path connecting the compressor to the turbine, and at least one combustion chamber arranged in the gas path connecting the compressor to the turbine;
a flue gas path connected to the turbine, a fresh gas path connected to the compressor, and a recirculation path;
at least one flue gas recirculation device configured and arranged, when the gas turbine installation is operating, to pass combustion flue gas from the turbine from the flue gas path, via the recirculation path, to the fresh gas path;
a control device configured and arranged to regulate the flow, temperature, or both, of the recirculated combustion flue gases so that a fresh gas/flue gas mixture which enters the compressor is at a predetermined desired temperature;
a recirculation cooler configured and arranged to cool the recirculated combustion flue gases, the cooling capacity of which recirculation cooler can be controlled by and which is coupled to the control device, arranged in the recirculation path;
wherein the recirculation cooler comprises a water spray cooler which, to cool the recirculated combustion flue gases, is configured and arranged to spray water into the recirculated combustion flue gases.

2. A gas turbine installation according to claim 1, wherein the recirculation cooler is configured and arranged to cool the recirculated combustion flue gas to a temperature below the ambient temperature surrounding the gas turbine installation.

3. A gas turbine installation according to claim 1, further comprising:
a recirculation valve coupled to the control device and arranged in the recirculation path by which at least a portion of the volumetric flow of the recirculated combustion flue gases can be controlled.

4. A gas turbine installation according to claim 1, further comprising:
an introduction point at which the recirculation path connects to the fresh gas path, and at least one temperature sensor coupled to the control device and arranged in the fresh gas path downstream or upstream of the introduction point; or
a recirculation cooler configured and arranged to cool recirculated combustion flue gases, and at least one temperature sensor coupled to the control device and arranged in the recirculation path downstream or upstream of the recirculation cooler; or
at least one flow sensor coupled to the control device and arranged in the recirculation path; or
combinations thereof.

5. A gas turbine installation according to claim 1, further comprising:
a heat recovery steam generator arranged in the flue gas path; and
wherein the recirculation path branches off from the flue gas path downstream of the heat recovery steam generator.

6. A gas turbine installation according to claim 5, further comprising:
a flue gas cooler arranged in the flue gas path downstream of the steam generator; and
wherein the recirculation path branches off from the flue gas path downstream or upstream of the flue gas cooler.

7. A gas turbine installation according to claim 1, further comprising:
a carbon dioxide separation device configured and arranged to remove carbon dioxide from the combustion flue gas, arranged in the flue gas path and leading to the ambient atmosphere.

8. A gas turbine installation according to claim 7, wherein the recirculation path branches off from the flue gas path upstream or downstream of the carbon dioxide separation device.

9. A gas turbine installation according to claim 1, wherein the compressor comprises an atomization device configured and arranged to inject water droplets into the fresh gas/flue gas mixture.

10. A gas turbine installation according to claim 1, further comprising:
a blower configured and arranged to drive the recirculated combustion flue gases in the direction of the fresh gas path, arranged in the recirculation path.

11. A gas turbine installation according to claim 10, wherein the blower is coupled to the control device, and with which blower at least a portion of the flow of the recirculated combustion flue gases can be controlled.

12. A gas turbine installation according to claim 1, further comprising:
a device for increasing the oxygen content in the fresh gas, arranged in the fresh gas path.

13. A gas turbine installation according to claim 1, wherein the control device is configured and arranged to set the desired temperature to an accuracy of within +/−5 K.

14. A gas turbine installation according to claim 1, further comprising:
- a recirculation cooler configured and arranged to cool the recirculated combustion exhaust gases; and wherein the exhaust gas recirculation device comprises a dehumidification device arranged in the recirculation path upstream or downstream of the recirculation cooler.

15. A power plant for generating electricity comprising a gas turbine installation according to claim 1.

* * * * *